US011081172B1

(12) United States Patent
Cheng et al.

(10) Patent No.: US 11,081,172 B1
(45) Date of Patent: Aug. 3, 2021

(54) ON-CHIP SECURITY KEY WITH PHASE CHANGE MEMORY

(71) Applicant: INTERNATIONAL BUSINESS MACHINES CORPORATION, Armonk, NY (US)

(72) Inventors: Kangguo Cheng, Schenectady, NY (US); Carl Radens, LaGrangeville, NY (US); Ruilong Xie, Niskayuna, NY (US); Juntao Li, Cohoes, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/838,157

(22) Filed: Apr. 2, 2020

(51) Int. Cl.
*G11C 11/408* (2006.01)
*G11C 11/4094* (2006.01)
*G11C 11/56* (2006.01)
*G06F 21/71* (2013.01)

(52) U.S. Cl.
CPC .......... *G11C 11/5678* (2013.01); *G06F 21/71* (2013.01); *G11C 11/4085* (2013.01); *G11C 11/4094* (2013.01); *G11C 11/5628* (2013.01); *G11C 11/5642* (2013.01)

(58) Field of Classification Search
CPC ............ G11C 11/5678; G11C 11/4085; G11C 11/4094; G11C 11/5642; G11C 11/5628; G06F 21/71
See application file for complete search history.

(56) References Cited

U.S. PATENT DOCUMENTS

| | | | |
|---|---|---|---|
| 8,525,169 B1 | 9/2013 | Edelstein et al. | |
| 8,971,527 B2 | 3/2015 | Brightsky et al. | |
| 9,520,366 B2 | 12/2016 | Lamy et al. | |
| 9,806,718 B2 | 10/2017 | Wallrabenstein | |
| 9,916,884 B2 | 3/2018 | Augustine et al. | |
| 10,770,160 B2* | 9/2020 | Chung | G11C 13/0069 |
| 10,860,292 B2* | 12/2020 | Ielmini | G09C 1/00 |
| 2014/0140513 A1 | 5/2014 | BrightSky et al. | |
| 2018/0176025 A1 | 6/2018 | Suresh et al. | |

(Continued)

FOREIGN PATENT DOCUMENTS

CN 102104480 B 11/2014

OTHER PUBLICATIONS

Zhang et al., "Exploiting Process Variations and Programming Sensitivity of Phase Change Memory for Reconfigurable Physical Unclonable Functions", IEEE Transactions on Information Forensics and Security. vol. 9, No. 6. Jun. 2014. pp. 921-932.

(Continued)

*Primary Examiner* — Gene N Auduong
(74) *Attorney, Agent, or Firm* — Tutunjian & Bitetto, P.C.; Randall Bluestone

(57) ABSTRACT

A method is presented for forming an on-chip security key. The method includes electrically connecting a pair of phase change memory (PCM) elements in series, electrically connecting a programming transistor to the pair of PCM elements, electrically connecting an input of an inverter to a common node of the pair of PCM elements, setting the PCM elements to a low resistance state (LRS) in an initialization stage, applying a RESET pulse to generate a security bit and to cause one of the PCM elements to change to a high resistance state (HRS), and generating a logic "1" or "0" at the output of the inverter.

20 Claims, 5 Drawing Sheets

(56) References Cited

U.S. PATENT DOCUMENTS

2018/0287793 A1    10/2018  Khatib Zadeh et al.
2018/0337777 A1    11/2018  Shieh et al.
2018/0365069 A1*   12/2018  Nemiroff .............. H04L 9/0894

OTHER PUBLICATIONS

Zhang et al., "Design and security evaluation of PCM-based rPUF using cyclic refreshing strategy", IEICE Electronics Express. vol. 15, No. 10. May 25, 2018. pp. 1-9.

* cited by examiner

ON-CHIP SECURITY KEY WITH PHASE CHANGE MEMORY

BACKGROUND

The present invention relates generally to device security, and more specifically, to an on-chip security key with phase change memory.

A phase-change memory (PCM) is one of next-generation nonvolatile memory devices that are expected to meet an increasing demand for a high-performance and low-power semiconductor memory device. In PCM devices, data can be stored or erased by heating or cooling a phase-change layer therein.

The PCM device can also be used for analog computing applications thanks to the potential that multiple states can exist inside the cell. Weights can be stored in the PCM cell during the training or inference of neutral networks. However, the linearity of a PCM's state is one of the issues in PCM deployment in artificial intelligence (AI) applications.

SUMMARY

In accordance with an embodiment, a method is provided for forming an on-chip security key. The method includes electrically connecting a pair of phase change memory (PCM) elements in series, electrically connecting a programming transistor to the pair of PCM elements, electrically connecting an input of an inverter to a common node of the pair of PCM elements, setting the PCM elements to a low resistance state (LRS) in an initialization stage, applying a RESET pulse to generate a security bit and to cause one of the PCM elements to change to a high resistance state (HRS), and generating a logic "1" or "0" at the output of the inverter.

In accordance with another embodiment, a method is provided for forming an on-chip security key. The method includes setting a pair of phase change memory (PCM) elements to a low resistance state (LRS) by using a wordline (WL) and a bitline (BL), increasing WL voltage to increase current flow through the pair of PCM elements, changing one PCM element to a high resistance state (HRS), thus resulting in abrupt decrease of current flow through the PCM elements, generating a logic "1" or "0" at an output of an inverter connected to a common node of the pair of PCM elements based on which PCM element changes to HRS first, and performing a SET operation to erase information.

In accordance with yet another embodiment, an on-chip security key generator is provided. The on-chip security key generator includes a pair of phase change memory (PCM) elements electrically connected in series, a programming transistor electrically connected to the pair of PCM elements, an input of an inverter electrically connected to a common node of the pair of PCM elements, and an initialization stage for setting the PCM elements to a low resistance state (LRS), applying a RESET pulse to generate a security bit and to cause one of the PCM elements to change to a high resistance state (HRS), and generating a logic "1" or "0" at the output of the inverter.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
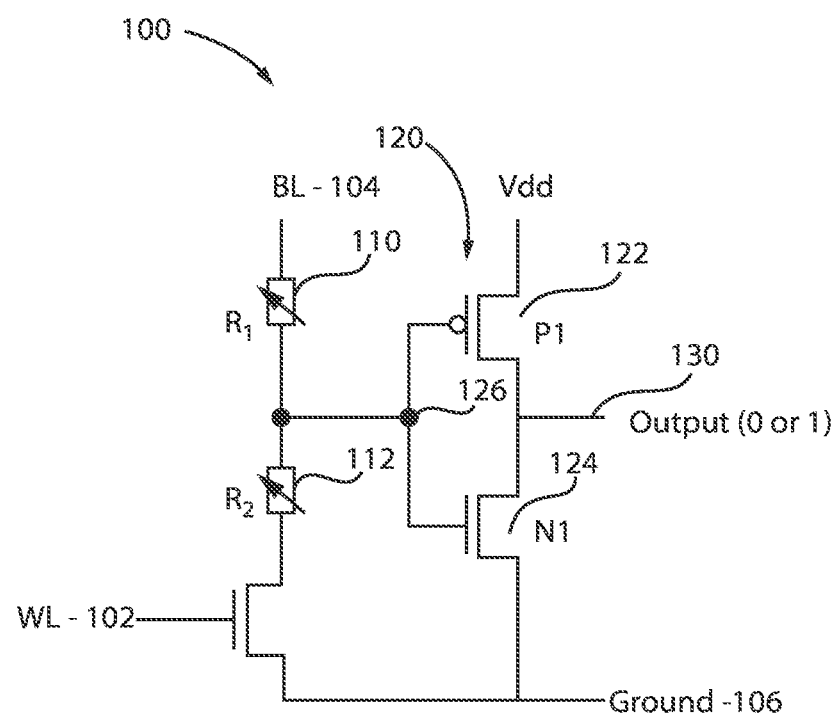
FIG. 1 illustrates a circuit for forming on-chip security keys with phase change memory (PCM), in accordance with an embodiment of the present invention.

Embodiments in accordance with the present invention provide methods and devices for employing a phase change memory structure or phase change memory (PCM) cell in on-chip security keys. Secure keys are necessary for a variety of applications such as preventing counterfeit chips, device authentication, cryptography, etc. A conventional approach to store security keys on-chip is to use electrical fuses or non-volatile flash memories. Such approach of storing keys permanently exhibits a risk of leaking security keys. Static random access memory (SRAM)-based security keys have emerged to overcome the above issue. SRAM-based security keys, however, rely on a transistor mismatch in an SRAM cell due to random process variation. The larger the transistor mismatch, the more stable (repeatable) SRAM security keys. Unfortunately, there are conflict requirements for complementary metal oxide semiconductor (CMOS) applications and security key applications. For CMOS applications, it is strived to minimize transistor mismatch. For SRAM security keys, it is desired to enhance (randomly) transistor mismatch.

Embodiments in accordance with the present invention provide methods and devices for alleviating such issues by forming on-chip security keys with phase change memory (PCM). Specially, each security key bit includes a pair of PCM cells, a programming transistor, and a standard CMOS inverter. The exemplary embodiments take advantages of the following intrinsic characteristics of PCM, the inherent much larger cell-to-cell variation of PCM compared to SRAM and abrupt resistance change during PCM RESET operation. Unlike the conventional secure key approach, the exemplary PCM security key only generates the security key on-the-fly when it is needed. If it is not needed (e.g., either the chip is powered off or the chip already used the key to for authentication), the key is erased to prevent key theft.

Embodiments in accordance with the present invention provide methods and devices for employing phase change based materials in PCM cells. Phase change materials, such as chalcogenides, can be caused to change phase between an amorphous state and a crystalline state by application of electrical current at levels suitable for implementation in integrated circuits. The generally amorphous state is characterized by higher resistivity than the generally crystalline state, which can be readily sensed to indicate data.

Phase change materials are capable of being switched between a first structural state in which the material is in a generally amorphous solid phase, and a second structural state in which the material is in a generally crystalline solid phase in the active region of the cell. The term "amorphous" is used to refer to a relatively less ordered structure, more disordered than a single crystal, which has the detectable characteristics such as higher electrical resistivity than the crystalline phase. The term "crystalline" is used to refer to a relatively more ordered structure, more ordered than in an amorphous structure, which has detectable characteristics such as lower electrical resistivity than the amorphous phase. Other material characteristics affected by the change between amorphous and crystalline phases include atomic order, free electron density and activation energy. The material can be switched into either different solid phases or mixtures of two or more solid phases, providing a gray scale between completely amorphous and completely crystalline states.

The change from the amorphous to the crystalline state is generally a lower current operation, requiring a current that is sufficient to raise the phase change material to a level between a phase transition temperature and a melting temperature. The change from crystalline to amorphous, referred to as "reset," is generally a higher current operation, which includes a short high current density pulse to melt or break down the crystalline structure, after which the phase change material cools quickly, quenching the phase change process, thus allowing at least a portion of the phase change structure to stabilize in the amorphous state.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 illustrates a circuit for forming on-chip security keys with phase change memory (PCM), in accordance with an embodiment of the present invention.

The circuit or on-chip security key generator 100 includes a pair of PCM cells 110, 112. PCM cells 110, 112 can be designated as R1 and R2, respectively. The first PCM cell 110 is connected to a bitline (BL) 104, whereas the second PCM cell 112 is connected to a wordline (WL) 102. An inverter 120 includes a p-type field effect transistor (PFET) 122 and an n-type field effect transistor (NFET) 124. The PFET 122 and the NFET 124 are connected to the PCM cells via a common node 126. In the initialization stage, PCM elements 110, 112 are SET to a low resistance state (LRS). A security bit is generated by applying a RESET pulse to cause one of the PCM elements 110, 112 to change to a high resistance state (HRS). A logic "1" or "0" is generated at the output 130 of the inverter 120.

In particular, initially, the pair of PCM cells 110, 112 (R1 and R2) is SET to a low resistance state (LRS) by using WL 102 and BL 104.

Then, the WL voltage is increased so as to increase the current flow through both R1 and R2. Due to intrinsic variability of PCM cells, one PCM will change to a high resistance state (HRS) first, resulting in an abrupt decrease of current flow through PCM cells 110, 112.

For example, R1 changes to HRS first.

The abrupt decrease of current causes insufficient joule heating for R2, so R2 remains in a LRS.

The output 130 of the inverter 120 depends on whether R1 or R2 changes to HRS first.

If R1 changes to HRS first, R2 remains in the LRS, the PFET 122 of the inverter 120 is turned ON, and the inverter 120 outputs ground 106 (logic "1").

If R2 changes to HRS first, R1 remains LRS, the NFET 124 of the inverter 120 is turned ON, and the inverter 120 outputs Vdd (logic "0").

Then a SET operation is performed to erase the information.

Figure 2:
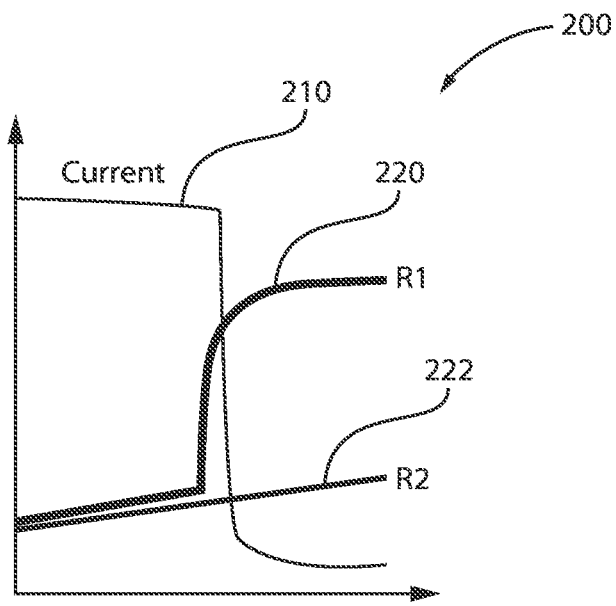
FIG. 2 illustrates PCM resistance change during RESET operation, in accordance with an embodiment of the present invention.

FIG. 2 illustrates PCM resistance change during RESET operation, in accordance with an embodiment of the present invention.

The graph 200 depicts how the change in current 210 affects the resistance change 220 of the first PCM element and the resistance change 222 of the second PCM element.

In particular, during a RESET operation (regenerate security key), the programming FET (N2) is turned ON. Current flows through the pair of PCM elements 110, 112 and resistance change occurs in R1 and R2. Due to the inherent variation of the PCM elements, either R1 or R2 will be reset first.

Assuming R1 resets first, meaning R1 goes to HRS, current will drop and R2 remains at LRS. The voltage of the inverter input terminal goes lower, the PFET 122 of the inverter 120 is turned ON, and consequently the inverter output 130 goes towards Vdd (logic "1").

Conversely, if R2 changes to HRS first, R1 remains at LRS, the NFET 124 of the inverter 120 is turned ON, and the inverter output 130 goes towards GND (logic "0").

Each security bit cell produces a single bit.

An array of multiple bit cells can generate a secure key with multiple bits.

After using the key, all PCM cells are set to LRS to erase the key to avoid key leaking.

Figure 3:
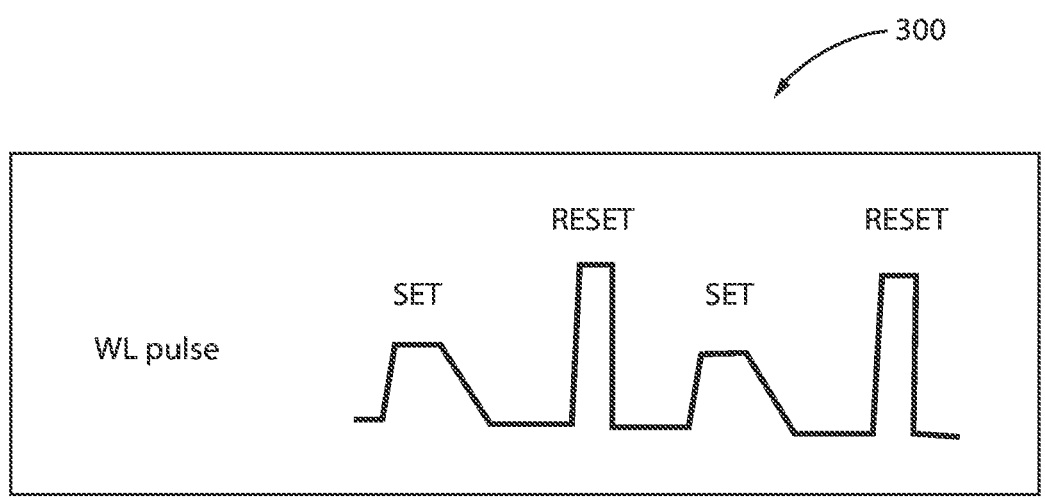
FIG. 3 illustrates a wordline (WL) pulse during SET and RESET operations, in accordance with an embodiment of the present invention.

FIG. 3 illustrates a wordline (WL) pulse during SET and RESET operations, in accordance with an embodiment of the present invention.

Variations of the WL pulse 300 are shown during SET and RESET operations.

Figure 4:
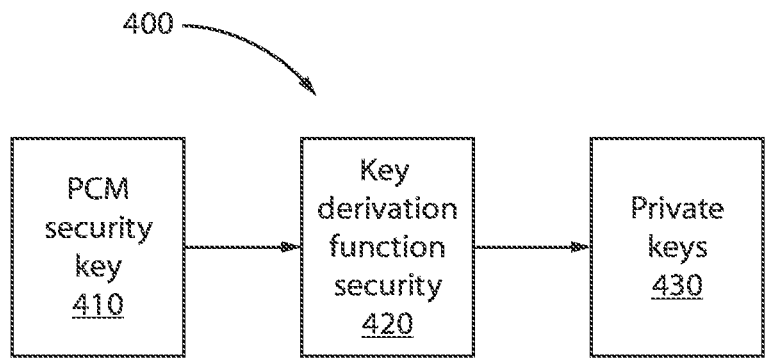
FIG. 4 is a block/flow diagram for employing the PCM security key as a root key to generate cryptography keys, in accordance with an embodiment of the present invention.

FIG. 4 is a block/flow diagram 400 for employing the PCM security key as a root key to generate cryptography keys, in accordance with an embodiment of the present invention.

Figure 5:
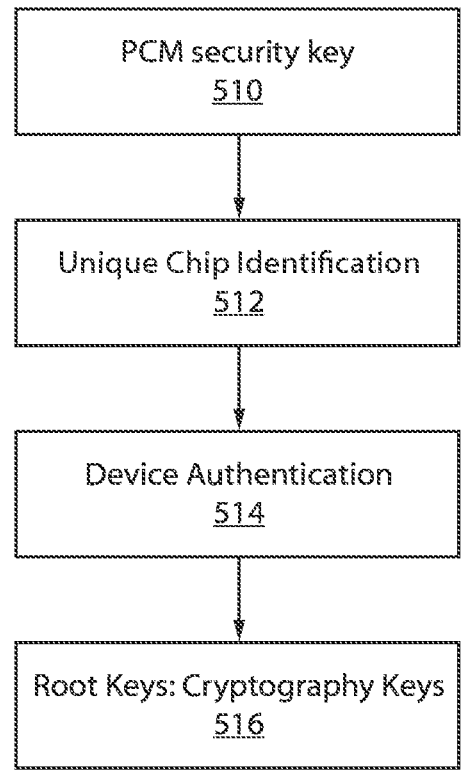
FIG. 5 is a block/flow diagram for employing the PCM security key for a variety of practical applications, in accordance with an embodiment of the present invention.

The PCM security key can be used for a variety of applications, including but not limited to, unique chip identification, device authentication, root keys to generate cryptography keys (e.g., public/private key pair for asymmetric cryptography), as shown in FIG. 5.

FIG. 4 is an example of using a PCM security key 410 as the root key to generate cryptography keys by feeding the root key to a key derivation function 420 to regenerate private keys 430. Since a private key is never physically stored on the chip, it prevents key leaking.

FIG. 5 is a block/flow diagram for employing the PCM security key for a variety of practical applications, in accordance with an embodiment of the present invention.

At block 510, the PCM security key can be employed for a variety of applications. For example, the PCM security key 510 can be applied to unique chip identification applications 512, device authentication applications 514, and root key/cryptography key applications 516.

In particular, counterfeiting and piracy are longstanding problems growing in scope and magnitude. They are of great concern to government and industry because of the negative impact they can have on innovation, economic growth, and employment, the threat they pose to the welfare of consumers, the substantial resources that they channel into criminal networks, organized crime, and other groups that disrupt society, and finally, the loss of business from the trade in counterfeits.

Innovation in the business sector has always been the main driver of economic growth, through the development and implementation of ideas for new products and processes. These inventions are usually protected via patents, copyrights, and trademarks. However, without adequate protection of these intellectual property (IP) rights, the incentives to develop these new ideas and products would be considerably reduced, thereby weakening critical thinking and the innovation process.

These risks are particularly high for those industries in which the research and development (R&D) costs associated with the development of new products are very high compared to the cost of producing the resulting products. In the world of electronics, the R&D costs for the semiconductor industry are indeed extremely high, and protection of their IP rights is of the utmost importance.

Counterfeiting of integrated circuits has become a major challenge due to deficiencies in the existing test solutions and lack of effective avoidance mechanisms in place.

As the complexity of the electronic systems, along with the ICs used in them, has increased significantly over the past few decades, they are assembled (fabricated) globally to reduce the production cost. For example, large foundries located in different countries can offer lower prices to the design houses. This globalization leads to an illicit market willing to undercut the competition with counterfeit parts.

With counterfeit incidents on the rise, it is increasingly important to analyze the vulnerabilities of the electronic component supply chain. The most commonly counterfeited components are analog ICs, microprocessor ICs, memory ICs, programmable logic ICs, and transistors. The security keys with a pair of PCM cells employed by the exemplary embodiments of the present invention can aid in the reduction of counterfeiting and piracy.

Figure 6:
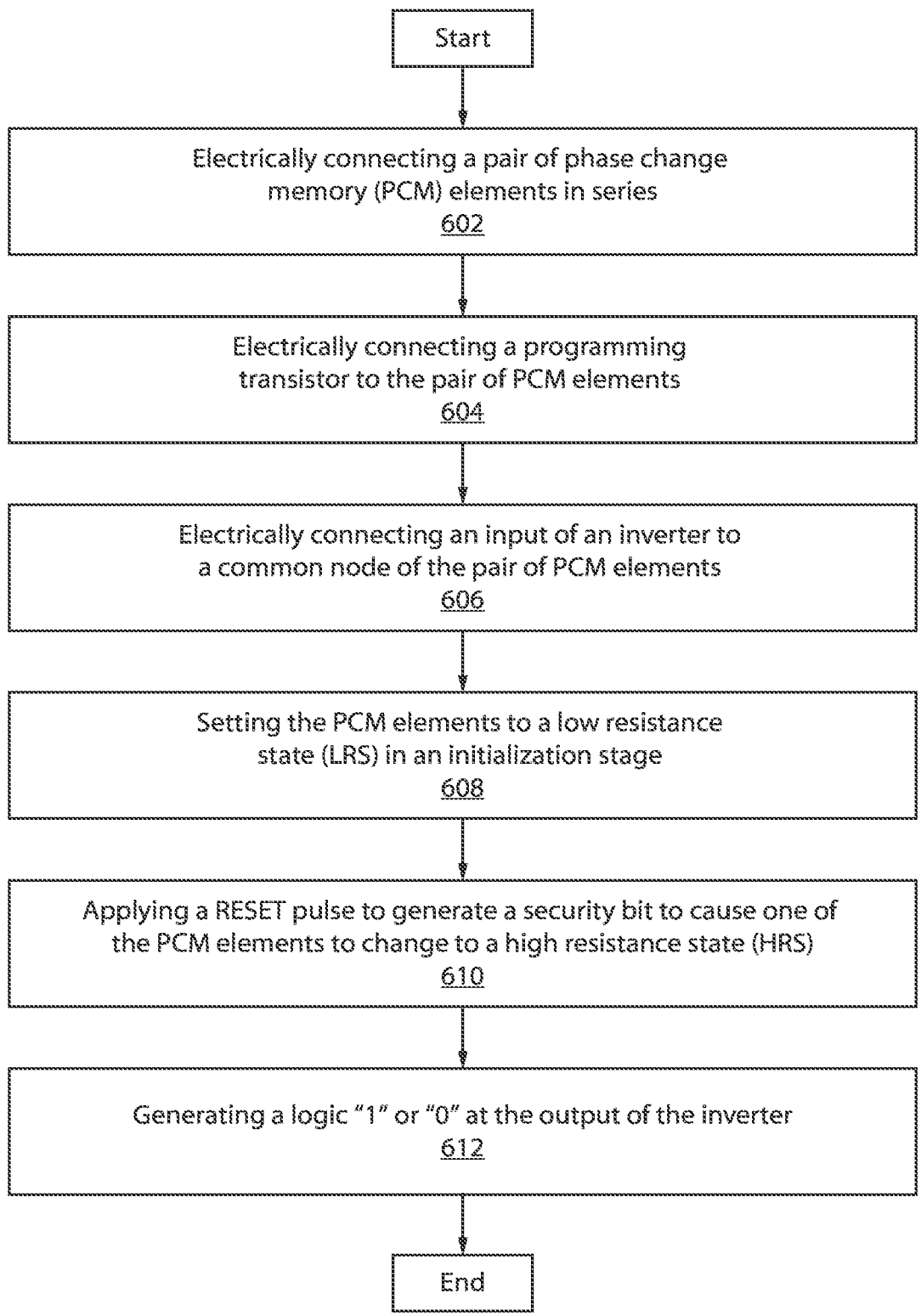
FIG. 6 is a block/flow diagram of a method for employing PCM security keys, in accordance with another embodiment of the present invention.

FIG. 6 is a block/flow diagram of a method for employing PCM security keys, in accordance with another embodiment of the present invention.

At block 602, electrically connect a pair of phase change memory (PCM) elements in series.

At block 604, electrically connect a programming transistor to the pair of PCM elements.

At block 606, electrically connect an input of an inverter to a common node of the pair of PCM elements.

At block 608, set the PCM elements to a low resistance state (LRS) in an initialization stage.

At block 610, apply a RESET pulse to generate a security bit and to cause one of the PCM elements to change to a high resistance state (HRS).

At block 612, generate a logic "1" or "0" at the output of the inverter.

Figure 7:
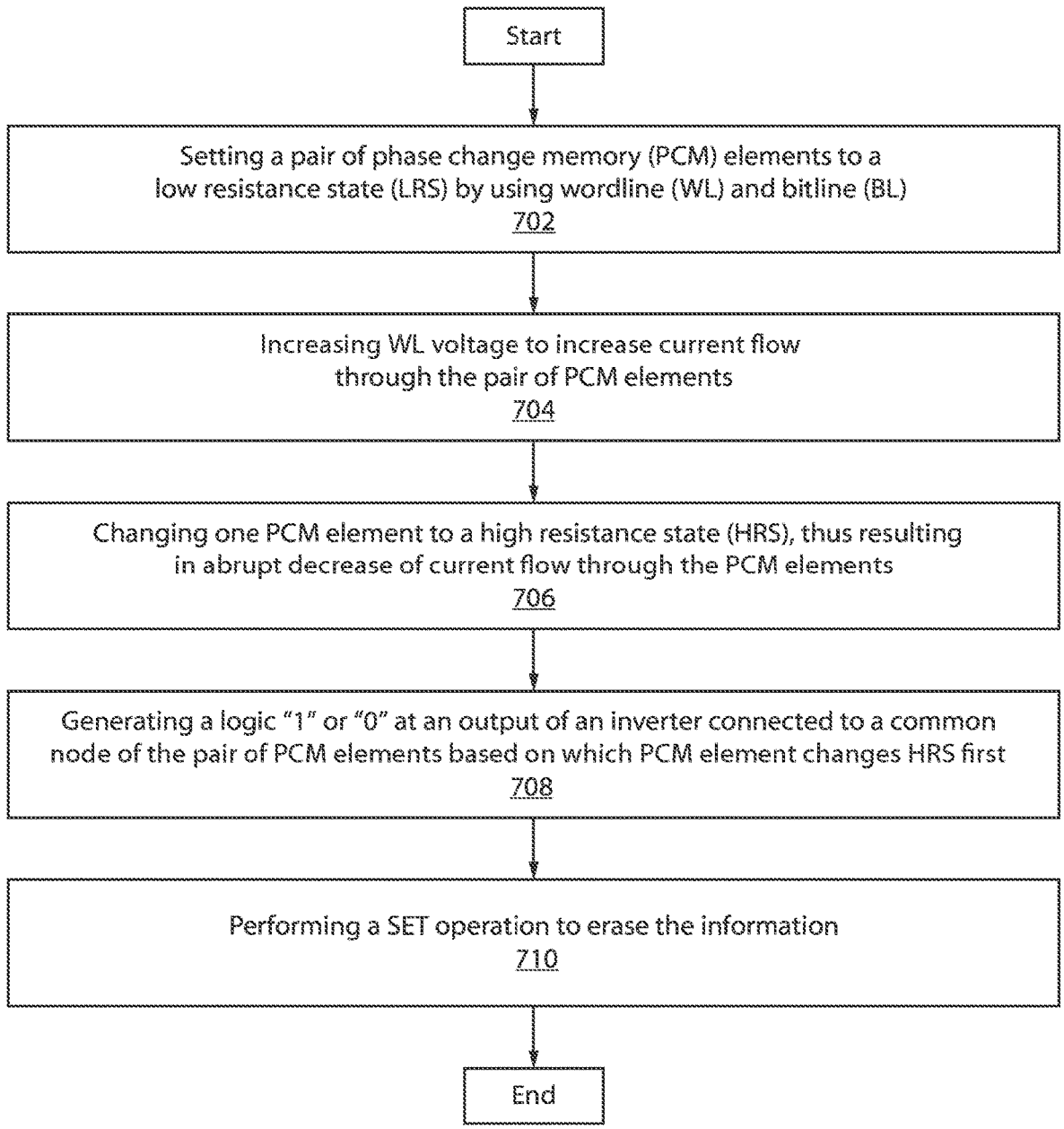
FIG. 7 is a block/flow diagram of a method for employing PCM security keys by setting wordline and bitline, in accordance with an embodiment of the present invention.

FIG. 7 is a block/flow diagram of a method for employing PCM security keys by setting wordline and bitline, in accordance with an embodiment of the present invention.

At block 702, set a pair of phase change memory (PCM) elements to a low resistance state (LRS) by using wordline (WL) and bitline (BL).

At block 704, increase WL voltage to increase current flow through the pair of PCM elements.

At block 706, change one PCM element to a high resistance state (HRS), thus resulting in abrupt decrease of current flow through the PCM elements.

At block 708, generate a logic "1" or "0" at an output of an inverter connected to a common node of the pair of PCM elements based on which PCM element changes to HRS first.

At block 710, perform a SET operation to erase the information.

Regarding FIGS. 1-7, a PCM cell has a phase change material (e.g., Ge—Sb—Te (germanium-antimony-tellurium or "GST") between two electrodes. The resistance of PCM depends on the phase of PCM material. As noted above, amorphous phase relates to a high resistance state (HRS), whereas crystalline phase relates to a low resistance state (LRS). The cell can have different configurations (e.g., confined cell or mushroom cell).

In the SET operation, the method can apply a pulse (low voltage/long duration) to heat up the PCM below its melting point. The PCM thus recrystallizes, that is, changes from an amorphous state to a crystalline state, where HRS=>LRS.

In the RESET operation, the method can apply a pulse (high voltage/short duration) to heat up the PCM above its melting point and then quench, that is, change from the amorphous state to the crystalline state, where LRS=>HRS.

A fundamental characteristics of PCM is that PCM resistance increase abruptly during RESET.

In various example embodiments, each PCM cell 110, 112 can include a phase change material stack. The phase change material stack can be a GST stack. The GST stack can include multiple layers. The PCM cells 110, 112 can be any material that is capable of changing phase in response to the application of some stimuli (e.g., current or heat). In one embodiment, the PCM cells include chalcogenide glass. Chalcogenide generally includes one or more elements from group 16 of the periodic table (e.g., sulfur, selenium, tellurium). Thus, in various embodiments, a PCM can include doped $Ge_2Sb_2Te_5$, AsS, $As_2S_3$, and various other phase change materials.

Phase change materials can be changed from one phase state to another by application of electrical pulses. A shorter, higher amplitude pulse tends to change the phase change material to a generally amorphous state, and is referred to as a reset pulse. A longer, lower amplitude pulse tends to change the phase change material to a generally crystalline state, and is referred to as a program pulse. The energy in a shorter, higher amplitude pulse is high enough to melt the material in the active volume, and short enough to allow the material to solidify in the amorphous state.

The phase change materials can include chalcogenide based materials and other materials. Chalcogens include any of the four elements oxygen (O), sulfur (S), selenium (Se), and tellurium (Te), forming part of group VI of the periodic table. Chalcogenides include compounds of a chalcogen with a more electropositive element or radical. Chalcogenide alloys include combinations of chalcogenides with other materials such as transition metals. A chalcogenide alloy usually includes one or more elements from column six of the periodic table of elements, such as germanium (Ge) and tin (Sn). Often, chalcogenide alloys include combinations including one or more of antimony (Sb), gallium (Ga), indium (In), and silver (Ag). Phase change based memory materials can include alloys of: Ga/Sb, In/Sb, In/Se, Sb/Te, Ge/Te, Ge/Sb/Te, In/Sb/Te, Ga/Se/Te, Sn/Sb/Te, In/Sb/Ge, Ag/In/Sb/Te, Ge/Sn/Sb/Te, Ge/Sb/Se/Te and Te/Ge/Sb/S. In the family of Ge/Sb/Te alloys, a wide range of alloy compositions are workable.

Chalcogenides and other phase change materials are doped with impurities in some embodiments to modify conductivity, transition temperature, melting temperature, and other properties of memory elements using the doped chalcogenides. Representative impurities employed for doping chalcogenides include nitrogen, silicon, oxygen, silicon dioxide, silicon nitride, copper, silver, gold, aluminum, aluminum oxide, tantalum, tantalum oxide, tantalum nitride, titanium and titanium oxide.

In the present examples, the phase change material stacks can include a Ge—Sb—Te (germanium-antimony-tellurium or "GST") alloy. Alternatively, other suitable materials for the phase change material stack optionally include Si—Sb—Te alloys, Ga—Sb—Te alloys, As—Sb—Te alloys, Ag—In—Sb—Te alloys, Ge—In—Sb—Te alloys, Ge—Sb alloys, Sb—Te alloys, Si—Sb alloys, and combinations thereof.

In summary, the exemplary embodiments of the present invention provide methods and devices for forming on-chip security keys with PCM. Specially, each security key bit includes a pair of PCM cells, a programming transistor, and a standard CMOS inverter. The exemplary embodiments take advantages of following intrinsic characteristics of PCM, the inherent much larger cell-to-cell variation of PCM than SRAM and abrupt resistance change during PCM RESET operation. Unlike the conventional secure key approach, the exemplary PCM security key only generates the security key on-the-fly when it is needed. If it is not needed (e.g., either the chip is powered off or the chip already used the key to for authentication), the key is erased to prevent key theft.

The exemplary embodiments of the present invention further provide for a physically unclonable function (PUF) that relies solely on electrical operation, where no other physical or structural components, such as a laser, are needed. Additionally, the PUF of the exemplary embodiments directly produces a logic state "1" or "0," thus eliminating the need to directly measure PCM resistance and eliminating the need for employing other structural elements, such as an analog-to-digital converter (ADC). The PUF of the exemplary embodiments is formed by employing a pair of PCM cell elements (R1, R2).

Regarding further practical applications of the exemplary embodiments, hardware based "Root of Trust" is a fundamental building block for any secure computing system. Key elements of secure computing require authentication, sending data to an authorized source, and/or loading data onto a designated device. In general, cryptographic keys in binary code form the basis of securing data and bit streams. Usually, such cryptographic keys are stored in non-volatile memory and are present on an integrated circuit (IC) at all times. If an attacker can extract the key from a device, the entire foundation for secure computing is in jeopardy. For example, an attacker with physical access to the device can delayer a chip, and read out the stored code based on the state of the transistors. Thus, securing cryptographic keys requires anti-tamper technologies, which can be relatively expensive and can therefore not be suitable for implementation in various devices like field programmable gate arrays (FPGAs), mobile devices, and/or sensors.

Exemplary embodiments of the present invention include secure devices having unique physical properties, or physical unclonable functions (PUFs) for storing secret codes used for authentication and key generation. A physical unclonable function includes a set of unique analog values from structures and materials that can be measured on chip (e.g., by a measurement circuit) followed by conversion to a code, or key, in binary form. The exemplary embodiments of the present invention describe unique structures that can be used as physical unclonable functions. For example, a device having a unique physical unclonable function according to embodiments of the present invention can include an integrated circuit including a pair of PCM elements (R1, R2).

One of the principles behind a PUF is that the cryptographic key(s) are not stored in binary form when the chip is powered down but are hidden in the form of unique physical analog identifiers within the hardware so that the code can only be executed on a designated authorized uncompromised IC. Thus, when a circuit is turned on, the structures including the PUF can be measured and the analog values converted into a binary code (or key) using an on chip measurement circuit. Exemplary embodiments of the present invention employ PUFs including a pair of PCM cells to construct secure computing systems.

Deposition is any process that grows, coats, or otherwise transfers a material onto the wafer. Available technologies include, but are not limited to, thermal oxidation, physical vapor deposition (PVD), chemical vapor deposition (CVD), electrochemical deposition (ECD), molecular beam epitaxy (MBE) and more recently, atomic layer deposition (ALD) among others. As used herein, "depositing" can include any now known or later developed techniques appropriate for the material to be deposited including but not limited to, for example: chemical vapor deposition (CVD), low-pressure CVD (LPCVD), plasma-enhanced CVD (PECVD), semi-atmosphere CVD (SACVD) and high density plasma CVD (HDPCVD), rapid thermal CVD (RTCVD), ultra-high vacuum CVD (UHVCVD), limited reaction processing CVD (LRPCVD), metal-organic CVD (MOCVD), sputtering deposition, ion beam deposition, electron beam deposition, laser assisted deposition, thermal oxidation, thermal nitridation, spin-on methods, physical vapor deposition (PVD), atomic layer deposition (ALD), chemical oxidation, molecular beam epitaxy (MBE), plating, evaporation.

It is to be understood that the present invention will be described in terms of a given illustrative architecture; however, other architectures, structures, substrate materials and process features and steps/blocks can be varied within the scope of the present invention.

It will also be understood that when an element such as a layer, region or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The present embodiments can include a design for an integrated circuit chip, which can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer can transmit the resulting design by physical mechanisms (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which include multiple copies of the chip design in question that are to be formed on a wafer. The photolithographic masks are utilized to define areas of the wafer to be etched or otherwise processed.

Methods as described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements can be included in the compound and still function in accordance with the present embodiments. The compounds with additional elements will be referred to herein as alloys. Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Having described preferred embodiments of an on-chip security key with phase change memory (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for forming an on-chip security key, the method comprising:
   electrically connecting a pair of phase change memory (PCM) elements in series;
   electrically connecting a programming transistor to the pair of PCM elements;
   electrically connecting an input of an inverter to a common node of the pair of PCM elements;
   setting the PCM elements to a low resistance state (LRS) in an initialization stage;

applying a RESET pulse to generate a security bit and to cause one of the PCM elements to change to a high resistance state (HRS); and generating a logic "1" or "0" at the output of the inverter.

2. The method of claim 1, wherein the inverter includes an n-type field effect transistor (NFET) and a p-type field effect transistor (PFET).

3. The method of claim 1, wherein the PCM elements are set to the LRS by using a wordline (WL) and a bitline (BL).

4. The method of claim 3, wherein WL voltage is increased to increase current flow through the PCM elements.

5. The method of claim 4, wherein the change to the HRS by one of the PCM elements results in an abrupt decrease of the current flow through the PCM elements.

6. The method of claim 5, wherein the output of the inverter depends on whether the first PCM element or the second PCM element changes to HRS first.

7. The method of claim 6, wherein, if the first PCM element changes to HRS first, the second PCM element remains at the LRS.

8. The method of claim 7, wherein the PFET of the inverter is turned ON.

9. The method of claim 8, wherein the inverter generates the logic "1."

10. The method of claim 9, wherein a SET operation is performed to erase information.

11. The method of claim 6, wherein if the second PCM element changes to HRS first, the first PCM element remains at the LRS.

12. The method of claim 11, wherein the NFET of the inverter is turned ON.

13. The method of claim 12, wherein the inverter generates the logic "0."

14. The method of claim 13, wherein a SET operation is performed to erase information.

15. A method for forming an on-chip security key, the method comprising:

setting a pair of phase change memory (PCM) elements to a low resistance state (LRS) by using a wordline (WL) and a bitline (BL);

increasing WL voltage to increase current flow through the pair of PCM elements;

changing one PCM element to a high resistance state (HRS), thus resulting in abrupt decrease of current flow through the PCM elements;

generating a logic "1" or "0" at an output of an inverter connected to a common node of the pair of PCM elements based on which PCM element changes to HRS first; and performing a SET operation to erase information.

16. The method of claim 15, wherein, if the first PCM element changes to HRS first, the second PCM element remains at the LRS, the PFET of the inverter is turned ON, and the inverter generates the logic "1."

17. The method of claim 15, wherein, if the second PCM element changes to HRS first, the first PCM element remains at the LRS, the NFET of the inverter is turned ON, and the inverter generates the logic "0."

18. An on-chip security key generator comprising:

a pair of phase change memory (PCM) elements electrically connected in series;

a programming transistor electrically connected to the pair of PCM elements;

an input of an inverter electrically connected to a common node of the pair of PCM elements; and an initialization stage for:

setting the PCM elements to a low resistance state (LRS);

applying a RESET pulse to generate a security bit and to cause one of the PCM elements to change to a high resistance state (HRS); and generating a logic "1" or "0" at the output of the inverter.

19. The on-chip security key generator of claim 18, wherein the inverter includes an n-type field effect transistor (NFET) and a p-type field effect transistor (PFET).

20. The on-chip security key generator of claim 18, wherein the PCM elements are set to the LRS by using a wordline (WL) and a bitline (BL).

* * * * *